(12) United States Patent
Miháły et al.

(10) Patent No.: US 9,277,538 B2
(45) Date of Patent: Mar. 1, 2016

(54) NODE SELECTION IN A PACKET CORE NETWORK

(75) Inventors: Attila Miháły, Dunakeszi (HU); Åke Arvidsson, Solna (SE); Johan Rune, Lidingö (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 202 days.

(21) Appl. No.: 13/995,242

(22) PCT Filed: Dec. 22, 2010

(86) PCT No.: PCT/SE2010/051460
§ 371 (c)(1),
(2), (4) Date: Jun. 20, 2013

(87) PCT Pub. No.: WO2012/087207
PCT Pub. Date: Jun. 28, 2012

(65) Prior Publication Data
US 2013/0272256 A1  Oct. 17, 2013

(51) Int. Cl.
*H04W 4/00* (2009.01)
*H04W 36/00* (2009.01)
(Continued)

(52) U.S. Cl.
CPC ........... *H04W 72/04* (2013.01); *H04L 29/1265* (2013.01); *H04L 29/12066* (2013.01); *H04L 61/1511* (2013.01); *H04L 41/145* (2013.01); *H04W 8/26* (2013.01); *H04W 76/02* (2013.01)

(58) Field of Classification Search
CPC . H04L 61/1511; H04L 61/1505; H04L 61/15; H04L 61/3075; H04L 29/12066; H04L 63/104; H04L 12/66; H04L 65/1069; H04L 29/12594; H04L 29/1265; H04L 29/12132; H04W 88/16; H04W 48/18; H04W 48/20
See application file for complete search history.

(56) References Cited

U.S. PATENT DOCUMENTS

| 7,886,023 | B1 * | 2/2011 | Johnson | H04L 67/1002 709/219 |
| 8,356,169 | B2 * | 1/2013 | Ishikawa et al. | 713/150 |

(Continued)

FOREIGN PATENT DOCUMENTS

| EP | 1587272 A1 | 10/2005 |
| WO | 2009092440 A1 | 7/2009 |

(Continued)

OTHER PUBLICATIONS

3rd Generation Partnership Project, "3rd Generation Partnership Project; Technical Specification Group Core Network and Terminals; Domain Name System Procedures; Stage 3 (Release 9)", Technical Specification, 3GPP TS 29.303 V9.2.0, Sep. 1, 2010, pp. 1-51, 3GPP, France.

(Continued)

*Primary Examiner* — Wutchung Chu
(74) *Attorney, Agent, or Firm* — Coats & Bennett, P.L.L.C.

(57) ABSTRACT

A method of allocating user plane nodes to a connection being established across a packet core network is described. The method comprises maintaining at a Domain Name System (DNS) server one or more DNS resource records for each available user plane node in the packet core network, wherein the one or more DNS resource records comprises a fully qualified domain name (FQDN) for each area identity, each area identity represents a group of user plane nodes, associated with a user plane node in the packet core network; processing a connection establishment request originating from a user equipment (UE) to a core network node within the packet core network; sending a DNS query to a DNS server, the query containing at least one criterion for selecting a user plane node; receiving the query at the DNS server and, on the basis of the or each criterion, identifying one or more DNS resource records satisfying the criteria/criterion, and returning the identified DNS resource record(s) to said core network node; and receiving the DNS resource record(s) at the core network node, and using the fully qualified domain names (FQDNs) representing each area identity associated with a user plane node in the packet core network that are contained in the or each DNS resource record(s) when allocating a user plane node to said connection. A core network node arranged to allocate user plane nodes to a connection being established across a packet core network, and an apparatus configured to operate as a Domain Name System (DNS) server are also described.

17 Claims, 5 Drawing Sheets

(51) Int. Cl.
*H04W 72/04* (2009.01)
*H04L 12/28* (2006.01)
*H04L 29/12* (2006.01)
*G06F 15/173* (2006.01)
*G06F 17/30* (2006.01)
*H04L 12/24* (2006.01)
*H04W 8/26* (2009.01)
*H04W 76/02* (2009.01)

(56) References Cited

U.S. PATENT DOCUMENTS

| | | | |
|---|---|---|---|
| 2002/0124060 A1* | 9/2002 | Jinzaki | H04L 29/12066 709/219 |
| 2004/0215707 A1* | 10/2004 | Fujita et al. | 709/201 |
| 2004/0249975 A1* | 12/2004 | Tuck et al. | 709/245 |
| 2005/0159156 A1 | 7/2005 | Bajko et al. | |
| 2006/0129665 A1* | 6/2006 | Toebes et al. | 709/223 |
| 2008/0235383 A1* | 9/2008 | Schneider | 709/229 |
| 2009/0059936 A1* | 3/2009 | Van De Poel | H04L 29/12066 370/401 |
| 2009/0240795 A1 | 9/2009 | Tsirtsis et al. | |
| 2010/0054222 A1* | 3/2010 | Rune | 370/338 |
| 2010/0208742 A1* | 8/2010 | Kafle | H04L 29/12028 370/401 |
| 2011/0082919 A1* | 4/2011 | Qiu et al. | 709/221 |
| 2011/0090852 A1* | 4/2011 | Ramle | H04W 48/17 370/328 |
| 2011/0103310 A1* | 5/2011 | Stojanovski | H04L 12/66 370/328 |
| 2011/0235546 A1* | 9/2011 | Horn | H04L 12/66 370/254 |
| 2011/0258272 A1* | 10/2011 | Drako et al. | 709/206 |
| 2011/0271005 A1* | 11/2011 | Bharrat et al. | 709/232 |
| 2012/0178416 A1* | 7/2012 | Miklos et al. | 455/410 |
| 2012/0214445 A1* | 8/2012 | Stojanovski | H04L 63/164 455/411 |
| 2013/0121298 A1* | 5/2013 | Rune et al. | 370/329 |

FOREIGN PATENT DOCUMENTS

| | | |
|---|---|---|
| WO | WO 2009092440 A1 * | 7/2009 |
| WO | 2009150003 A1 | 12/2009 |

OTHER PUBLICATIONS

Mark, David M. "Neighbor-based Properties of Some Orderings of Two-dimensional Space." Geographical Analysis, vol. 22, No. 2. Apr. 1990. pp. 145-157. Ohio State University Press, Columbus, OH.

Guo, D., et al., "Spatial ordering and encoding for geographic data mining and visualization." Journal of Intelligent Information Systems, vol. 27, No. 3, pp. 243-266. Nov. 2006. Springer, Berlin, Germany.

Mockapetris, P. "Domain Concepts and Facilities." Nov. 1987. RFC 1034, section 3.1. 2 pages. IETF, Reston, VA.

Daigle, L., et al., "Domain-Based Application Service Location Using SRV RRs and the Dynamic Delegation Discovery Service (DDDS)." RFC 3958. 25 pages. Jan. 2005. The Internet Society, Reston, VA.

3GPP. "Technical Specification Group Core Network and Terminals; Numbering, addressing and identification (Release 9)" 3GPP TS 23.003 V9.0.0. Sep. 2009. 72 pages. 3GPP, Sophia Antipolis, France.

3GPP. "Technical Specification Group Core Network and Terminals; Domain Name System Procedures; Stage 3 (Release 8)" 3GPP TS 29.303 V8.2.0. Jun. 2009. 51 pages. 3GPP, Sophia Antipolis, France.

* cited by examiner

NODE SELECTION IN A PACKET CORE NETWORK

TECHNICAL FIELD

The present invention relates to methods and apparatuses for achieving node selection within a packet network. The invention is applicable in particular, though not necessarily, to the so-called Evolved Packet System and to networks implementing or developed from this system.

BACKGROUND

The standard Gateway selection process in 3GPP networks is described in 3GPP technical specification [3GPP TS 29.303 V8.2.0 (2009-06), Domain Name System Procedures; Stage 3 (Release 8)].

A bearer for a PDN connection spans a number of user plane nodes from the User Equipment (UE), via the eNodeB (eNB), the Security Gateway (SeGW) at the border of the operator network, the Serving Gateway (SGW) to the PDN Gateway (PGW). In many cases the path of the traffic over the PDN connection continues from the PGW to an Autonomous System Border Router (ASBR), i.e. one of the operator's border routers constituting a peering point with other carriers, and further into the Internet. The Mobility Management Entity (MME) is a pure control plane node which, among other tasks, is involved in PDN connection establishments.

When a PDN connection is established, or its path is altered, some or all of the traversed nodes need to be (re)selected. Different selection mechanisms are used for different nodes:

The eNB is selected by the User Equipment (UE), governed by radio conditions and guiding parameters in the system information broadcast in the cells. (An exception is inter-eNB handover, where the source eNB, aided by measurement data from the UE, selects the target cell, and thus target eNB, for the handover.)

The SeGW selection is simply a consequence of the eNB selection, since the SeGW that the eNB is connected to has to be used.

The SGW is selected by the MME.

The SGW is selected for the default bearer at network Attach. A UE can only have a single SGW allocated at a time, so the same SGW is used also for subsequent bearers, irrespective of Access Point Name (APN).

The allocated SGW can be changed due to mobility, e.g. at handover or Tracking Area Update (TAU), in order to optimize the route or because the old SGW does not serve the new eNB. A SGW may serve a limited part of the PLMN's area (i.e. a limited fraction of the eNBs in the PLMN), denoted SGW Service Area (SA). SGW relocation due to fault situations is also possible.

The PGW is selected by the MME.

The PGW is selected for the default bearer for a certain APN. A UE can only have a single PGW allocated at a time for a certain APN, so the same PGW is used also for subsequent bearers for the same APN.

A PGW is allocated to the UE for each APN the UE chooses to use for communication (i.e. to establish a bearer for). Hence, a UE can be allocated multiple PGWs, one for each APN.

An allocated PGW is not changed—it remains the same irrespective of mobility for as long as the UE remains attached to the network (for each APN). Hence, each PGW must serve the entire PLMN.

The ASBR is selected through routing information and policies in the transport network layer and may hence in essence be seen as a consequence of the PGW selection. An exception is a roaming scenario where the operators of the visited and home PLMNs have established a mutual peering arrangement using a dedicated ASBR. In this scenario the ASBR is essentially a consequence of the PLMNs involved. If the two PLMNs have multiple dedicated ASBRs for mutual peering, then the choice among these ASBRs may be a consequence of the PGW selection. SGW/PGW selection takes place in the network whenever a SGW and/or a PGW needs to be allocated to a UE, either to serve a new PDN connection or to replace a previously allocated SGW. There are three cases in which SGW/PGW selection is triggered:

Attach (which includes establishment of an initial PDN connection and default bearer towards an APN). In this selection case both SGW and PGW are selected.

SGW relocation. In this selection case only the SGW is selected, while the PGW(s) remain(s) fixed.

Additional PDN connection establishment. In this selection case only a PGW is selected, while the already allocated SGW is reused.

According to present applicable 3GPP specification [3GPP TS 29.303 V8.2.0 (2009-06), Domain Name System Procedures; Stage 3 (Release 8); and 3GPP TS 23.003 v9.0.0, "3rd Generation Partnership Project; Technical Specification Group Core Network and Terminals; Numbering, addressing and identification (Release 9)", September 2009] the mechanisms that the MME can leverage to enable appropriate selections of SGWs/PGWs are based on the Straightforward Name Authority Pointer (S-NAPTR) DNS application (specified in [L. Daigle & A. Newton, "Domain-Based Application Service Location Using SRV RRs and the Dynamic Delegation Discovery Service (DDDS)", RFC 3958, January 2005]). S-NAPTR uses NAPTR and SRV resource records (RRs), but with certain restrictions in the flexibility of what is allowed in the NAPTR RRs. The following (Table 1) is a generic description of a NAPTR RR obeying the S-NAPTR restrictions:

TABLE 1

An example NAPTR Resource Record with the restrictions stipulated by S-NAPTR. The flags are restricted to the "a", "s" or "" (no flag) flags and the regexp field is unused (i.e. it is empty). The values of the order and pref fields are merely examples.

| S-NAPTR Resource Record Data | Comment |
| --- | --- |
| example.com | FQDN to match the FQDN in the query. |

TABLE 1-continued

An example NAPTR Resource Record with the restrictions stipulated by S-NAPTR. The flags are restricted to the "a", "s" or "" (no flag) flags and the regexp field is unused (i.e. it is empty). The values of the order and pref fields are merely examples.

| RR class (Internet) | RR type | Order | Pref | Flags | Data described in the comment column | |
|---|---|---|---|---|---|---|
| IN | NAPTR | 100 | 10 | "a"/"s"/"" | Example-service:example-protocol | Service:protocol |
| | | | | | "" | Regexp |
| | | | | | replacement-example.com | Replacement |

In this context S-NAPTR is utilized to indicate SGWs/PGWs which match the present selection case, e.g. in terms of supported APN, supported mobility protocol, support of the current location (Tracking Area) and/or topological closeness. This information is stored in NAPTR resource records (RRs) in the DNS server(s):

TAI→SGW mapping: The TAI is encoded in the field matching the FQDN in the query in the form of two labels for the TAC (one for the low byte, tac-lb<TAC low byte>, and one for the high byte, tac-hb<TAC high byte>) to the left of the label "tac" in an FQDN ending with epc.mnc<MNC>.mcc<MCC>.3gppnetwork.org (which thus includes the PLMN ID which complements the TAC into a TAI). An example could be tac-lb231.tac-hb14.tac.epc.mnc2.mcc46.3gppnetwork.org. Note that an FQDN is built up by multiple labels separated by dots (e.g. foo.example.com). The "< >" characters are often used to indicate a generic FQDN or label format, in which the expression within the brackets is supposed to be replaced by some real value/expression in order to form a specific (usable) FQDN/label. Using this notation, a generic expression for a three-label FQDN could be <label1>.<label2>.<top-domain-label>.

Supported mobility protocol→SGW/PGW mapping: The supported mobility protocol may be encoded in the service field.

Supported APN→PGW mapping: The APN is encoded in the field matching the FQDN in the query in the form of multiple labels, the rightmost of which should be "apn", in an FQDN ending with epc.mnc<MNC>.mcc<MCC>.3gppnetwork.org (e.g. internet.apn . . . epc.mnc2.mcc46.3gppnetwork.org or, generically, <apn-label-1>.[ . . . <apn-label-n>] . . . epc.mnc<MNC>.mcc<MCC>.3gppnetwork.org).

Topological closeness: The topological information may be encoded in the FQDNs in the replacement field in the form of multiple labels constituting the "node name". By comparing the node names of two different GWs (typically a SGW and a PGW) the MME may infer the relative topological closeness of the nodes from the number of consecutive identical labels (starting with the rightmost node name label)—the more identical labels, the closer the two nodes. Appending the label "topon" as the leftmost label indicates that topologically significant information has been encoded in the node name labels. A node name is canonical in the sense that it should be the same for all interfaces of a node (in case the node is multi-homed). Multiple (non-equivalent) interfaces of the same node, allocated for different services or connected to different networks, are distinguished by the first label to the left of the node name.

To let all of the above information impact the SGW/PGW selection, multiple NAPTR RRs have to be retrieved, corresponding to multiple DNS queries. However, the DNS mechanisms contain optimizations that drastically reduce the number of DNS queries required in practice. DNS servers send "additional section" information in their replies, which attempt to foresee and preclude subsequent requests, and in addition, DNS clients cache received DNS replies (although no longer than the lifetime indicated in the reply), which eliminates the majority of the queries.

Nevertheless, even though most of the DNS queries are avoided, a series of FQDNs (corresponding to potential queries) are involved in the procedure from the FQDN in the initial query to the FQDN in the finally returned A/AAAA resource record. The structure of the initial (input) FQDN and final (output) are specified by 3GPP, but the (arbitrary number of) intermediate FQDNs are left entirely to each operator to use in any way they assess beneficial, e.g. to encode other SGW/PGW properties which may be useful in the SGW/PGW selection process.

SUMMARY

It is understood by the inventor that it is highly desirable to provide methods and apparatuses for making the node selection process more efficient when allocating user plane nodes to a connection being established in a packet core network.

This problem is addressed by a method for enabling the allocation of user plane nodes to a connection being established across a packet core network. The method comprising maintaining at a Domain Name System (DNS) server one or more DNS resource records for each available user plane node in the packet core network, wherein the one or more DNS resource records comprises a fully qualified domain name (FQDN) for each area identity, each area identity represents an area or group of user plane nodes, associated with a user plane node in the packet core network, processing a connection establishment request originating from a user equipment (UE) connected to a core network node within the packet core network, sending a DNS query to a DNS server, the query containing at least one criterion for selecting a user plane node, receiving the query at the DNS server and, on the basis of the or each criterion, identifying one or more DNS resource records satisfying the criteria/criterion, and returning the identified DNS resource record(s) to said core network node, and receiving the DNS resource record(s) at the core network node, and using the fully qualified domain names (FQDNs) representing each area identity associated with a user plane node in the packet core network that are contained in the or each DNS resource record(s) when allocating a user plane node to said connection.

By enabling the allocation of user plane nodes according to the above, each of the DNS resource records stored in the DNS server contains a fully qualified domain name (FQDN) of a user plane node. This implies that every user plane node's position in the network topology of the packet core network is defined by the DNS resource records in the DNS server. When a connection establishment request is processed and the one or more DNS resource records matching the criterion of the DNS query are received at the core network node the FQDN(s) of the one or more DNS resource records can be compared with the FQDN of another received DNS resource record or with the FQDN of a user plane node currently allocated to the connection. If more than one DNS resource records are received the user plane node allocation is based on the FQDNs of the received DNS resource records. Since the FQDNs reflect the associated user plane nodes' position in the packet core network the core network node is then able to more efficiently select and allocate a user plane node to the connection.

The method for enabling the allocation of user plane nodes may further be characterized by that at least one user plane node in the packet core network is associated with at least two area identities. This advantageously allows the areas, or group of nodes, to overlap each other. The overlapping facilitates associating a given user plane node with different network topology relations. The user plane node to be allocated to the connection should be selected on the basis of its location in the network topology in relation to the location in the network topology of either another user plane node 150 to be allocated to the connection or a user plane node 150 currently allocated to the connection. A first user plane node may have a close relation to a second user plane node. However, the second user plane node may be positioned in an area different from the area the first user plane node belongs to. If the second user plane node is associated with both areas the close relation between the two user plane nodes will be reflected in the FQDN structure. Therefore, associating one user plane node with at least two FQDN is useful to further facilitate the operation of efficiently selecting and allocating a user plane node to a connection in the packet core network.

The method for enabling the allocation of user plane nodes may further be characterized by that each area identity is defined based on at least one criterion related to the transmission of data between the user plane nodes and associated hierarchical levels of the user plane nodes in the packet core network. This advantageously allows the areas, or groups of nodes, to be structured according to specific properties of the packet core network. If the data transfer cost between two specific user plane nodes are high, even though that they are positioned geographically close, they may be associated with different areas to prevent or decrease the probability of establishing a connection between them. Other examples of criteria related to the transmission of data is a metric used by the routing protocol in the network, a metric derived from traffic engineering requirements, a bandwidth related metric, a delay related metric, a packet loss probability metric, and a transmission cost related metric. Also, if the areas correlate with the hierarchical levels of the packet core network the connections can be directed to user plane nodes on the basis of the hierarchical levels of the packet core network. Hence, areas based on the different criteria as described above further facilitates the operation of efficiently selecting and allocating a user plane node to a connection in the packet core network.

The method for enabling the allocation of user plane nodes may further be characterized by that the fully qualified domain name (FQDN) for each user plane node and area identity comprises from left to right: the name of the user plane node, the area identity associated with the user plane node, and for each of a higher hierarchical level, the area identity of a neighboring area on that higher hierarchical level. This advantageously allows the FQDN of two or more user plane nodes to be compared by performing longest suffix match of the FQDNs. Hence, the name structure above further facilitates the operation of efficiently selecting and allocating a user plane node to a connection in the packet core network.

The method for enabling the allocation of user plane nodes may further be characterized by that using the fully qualified domain names (FQDNs) representing each area identity associated with a user plane node in the packet core network when allocating a user plane node to said connection comprises matching each of the fully qualified domain names (FQDN) of each of the received DNS resource records with the FQDN of another received DNS resource record or with the FQDN of a user plane node currently allocated to said connection, selecting the user plane node of which the FQDN of the received DNS resource record matches the most number of area identities, from right to left, with the FQDN of another received DNS resource record or with the FQDN of a user plane node currently allocated to said connection, and if more than one user plane nodes matches the most number of area identities, selecting the user plane node of which the FQDN has the least number of area identities. This advantageously allows proper selection of a user plane node based on the topology position in the packet core network. By using the user plane node with the longest suffix match the closest, from a network topology perspective, user plane node is allocated to the connection. However, when none of the candidate user plane nodes belong to the same area as another user plane node to be allocated to the connection or a user plane node currently allocated to the connection several of the candidate user plane nodes may have the same suffix match. Then the user plane node with the least number of area identities will be the one with the most preferable position in the network topology. This is because since none of the user plane nodes belong to the same area as another user plane node to be allocated to the connection or a user plane node currently allocated to the connection the user plane node to select will be found, in the best case, on the higher neighboring level of the hierarchical tree structure of the packet core network. Then, due to the hierarchical tree structure of the packet core network a match with more area identities will always be more distant than a match with lesser matching area identities since the hierarchy would have to be traversed first to a higher level and then down to a lower level. Hence, the selection rule above further facilitates the operation of efficiently selecting and allocating a user plane node to the connection in the packet core network.

The method for enabling the allocation of user plane nodes may further be characterized by that the method is used to allocate at least one of the following user plane nodes to the connection: a Serving Gateway (SGW), a Packet Data Network Gateway (PGW). This advantageously allows networks comprising SGW(s) and/or PGW(s) to benefit from the improved node selection process.

The method for enabling the allocation of user plane nodes may further be characterized by that the packet core network is a 3GPP Evolved Packet Core Network or 3GPP UMTS Packet Core Network. This advantageously allows the specific networks above to benefit from the improved node selection process.

Another aspect of the invention provides a method for allocating user plane nodes to a connection being established across a packet core network. The method comprising receiving a connection establishment request originating from a user equipment (UE), in response to the receipt of the connection establishment request, sending a DNS query to a DNS server, the query containing at least one criterion for selecting a user plane node, receiving a response from the DNS server comprising at least one DNS resource record satisfying the at least one criterion for selecting a user plane node, and allocating a user plane node to the connection being established by using fully qualified domain names (FQDNs) representing each area identity associated with a user plane node in the packet core network that are contained in the or each at least one DNS resource record(s).

By the method for allocating user plane nodes according to the above, when one or more DNS resource records matching the at least one criterion of the DNS query are received, the FQDN(s) of the one or more DNS queries can be compared with the FQDN of another received DNS resource record or with the FQDN of a user plane node currently allocated to said connection. If more than one DNS resource records are received the user plane node allocation is based on the FQDNs of the received DNS resource records. Since the FQDNs reflects the associated user plane node's position in the packet core network the core network node is then able to more efficiently selecting and allocating a user plane node to the connection.

The method for allocating user plane nodes may further be characterized by that the method step of allocating a user plane node to the connection being established, further comprises matching each of the fully qualified domain names (FQDN) of each of the received DNS resource records with the FQDN of another received DNS resource record or with the FQDN of a user plane node currently allocated to said connection, selecting the user plane node of which the FQDN of the received DNS resource record matches the most number of area identities, from right to left, with the FQDN of another received DNS resource record or with the FQDN of a user plane node currently allocated to said connection, and if more than one user plane nodes matches the most number of area identities, selecting the user plane node of which the FQDN has the least number of area identities. This advantageously allows proper selection of a user plane node based on the topology position in the packet core network. By using the user plane node with the longest suffix match the closest, from a network topology perspective, user plane node is allocated to the connection. However, when none of the candidate user plane nodes belong to the same area as another user plane node to be allocated to the connection or a user plane node currently allocated to the connection several of the candidate user plane nodes may have the same suffix match. Then the user plane node with the least number of area identities will be the one with the most preferable position in the network topology. This is because since none of the user plane nodes belong to the same area as another user plane node to be allocated to the connection or a user plane node currently allocated to the connection the user plane node to select will be found, in the best case, on the higher neighboring level of the hierarchical tree structure of the packet core network. Then, due to the hierarchical tree structure of the packet core network a match with more area identities will always be more distant than a match with lesser matching area identities since the hierarchy would have to be traversed first to a higher level and then down to a lower level. Hence, the selection rule above further facilitates the operation of efficiently selecting and allocating a user plane node to the connection in the packet core network.

The method for allocating user plane nodes may further be characterized by that the method step of allocating a user plane node to the connection being established, further comprises if more than one user plane nodes matches the most number of area identities, and the same user plane nodes has an equal number of area identities, selecting the user plane node based on at least one criterion related to the transmission of data to and from the same user plane nodes. This advantageously allows the selection of a user plane node even if more than one FQDN of the received DNS resource records matches the most number of area identities and has an equal number of area identities. In this case a criterion related to the transmission of data between the user plane nodes is used to select the user plane node to allocate to the connection. Hence, the selection rule above further facilitates the operation of efficiently selecting and allocating a user plane node to the connection in the packet core network.

The method for allocating user plane nodes may further be characterized by that the criterion related to the transmission of data to and from the same the user plane nodes relates to one or more of the following items a metric used by the routing protocol in the network, a metric derived from traffic engineering requirements, a bandwidth related metric, a delay related metric, a packet loss probability metric, and a transmission cost related metric. This advantageously allows the selection of a user plane node based on metrics of the packet core network in cases when the FQDN structure does not provide enough information for the selection. Hence, the selection rule above further facilitates the operation of efficiently selecting and allocating a user plane node to the connection in the packet core network.

The method for allocating user plane nodes may further be characterized by that the method step of allocating a user plane node to the connection being established, further comprises selecting the user plane node of which a site identity of the FQDN of the received DNS resource record matches a site identity of the FQDN of another received DNS resource record or with the FQDN of a user plane node currently allocated to said connection. This advantageously allows the prioritizing the selection of a user plane node located at the same site as another user plane node to be allocated to the connection or a user plane node currently allocated to the connection. User plane nodes located at the same site usually are located close to each other. Further e.g. data transmission costs are usually low within the same site. Therefore, including the user plane node's site in the FQDN further facilitates the operation of efficiently selecting and allocating a user plane node to a connection in the packet core network.

A further aspect of the invention provides a core network node arranged to allocate user plane nodes to a connection being established across a packet core network. The core network node comprising a connection establishment handler configured to process a connection establishment request, a user plane node selector comprising a DNS query sending unit responsive to receipt of a connection establishment request configured to send a DNS query to a DNS server, the query containing at least one criterion for selecting a user plane node, a DNS query response receiving unit configured to receive a response from the DNS server, the response containing at least one DNS resource record satisfying the criterion for selecting a user plane node, and a user plane node allocation unit capable of using fully qualified domain names (FQDNs) representing each area identity associated with a user plane node in the packet core network that are contained in the or each at least one DNS resource record(s) when allocating a user plane node or nodes to said connection.

A further aspect of the invention provides an apparatus configured to operate as a Domain Name System (DNS) server within a packet core network comprising a plurality of user plane nodes. The apparatus comprising a memory storing one or more DNS resource records for each available user plane node, wherein the one or more DNS resource record comprises a fully qualified domain name (FQDN) for each area identity associated with a user plane node in the packet core network, a DNS query receiving unit for receiving from a core network node a DNS query, the query containing one or more criterion for selecting a user plane node, a DNS resource record identifier unit for identifying one or more DNS resource records satisfying the criteria/criterion, and a DNS query response unit for returning the identified DNS resource record(s) to said core network node.

Further advantageous embodiments of the core network node are set forth in the dependent claims and correspond to advantageous already set forth with reference to the above mentioned methods.

BRIEF DESCRIPTION OF THE DRAWINGS

The various aspects of the invention, including its particular features and advantages, will be readily understood from the following detailed description and the accompanying drawings, in which.

DETAILED DESCRIPTION

Figure 1:
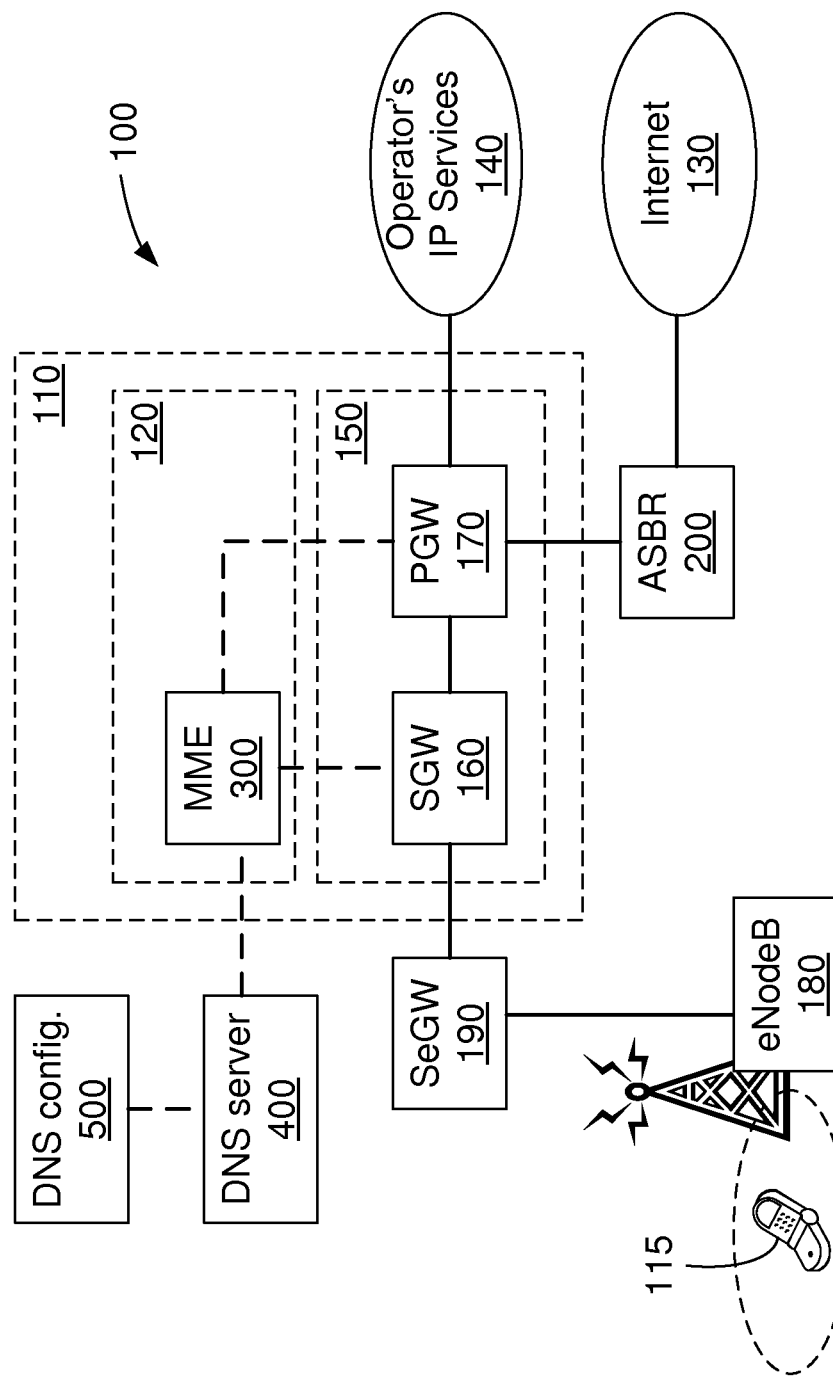
FIG. 1 shows a schematic, exemplifying system to which the present invention may be applied.

Throughout the following description similar reference numerals have been used to denote similar elements, parts, items or features, when applicable.

FIG. 1 shows a schematic, exemplifying system 100 to which the present invention may be applied. The system 100 comprises inter alia a packet core network 110 adapted to connect a User Equipment (UE) 115 to a Packet Data Network (PDN). It may be noted that the expression "User Equipment" includes, but is not limited to, a mobile terminal, a mobile phone, a personal digital assistant, a mobile station, a portable computer equipment with suitable transceivers and the like. The Packet Data Network (PDN) is in one example provided on the Internet 130 and in an alternative example supplied by an operator 140.

The packet core network 110 is in one example an Evolved Packet Core (EPC) network. In another example packet core network 110 is a General Packet Radio Service (GPRS) network. The packet core network 110 comprises a number of core network nodes 120 adapted to establish and control the PDN connections in the packet core network. In the illustrated example, the packet core nodes are formed as Mobility Management Entities (MMES) 300. In the other example of the GPRS network the packet core nodes are formed as Serving GPRS Support Nodes (SGSNs). The packet core network 110 further comprises a number of user plane nodes 150 adapted to route the traffic of the established PDN connection. The user plane nodes are in the illustrated example formed as Serving Gateways (SGWs) 160 and PDN Gateways (PGWs) 170. In the other example of the GPRS network the user plane nodes are formed as Gateway GPRS Support Nodes (GGSNs).

The system 100 further comprises the nodes eNodeB 180 and optionally a Security Gateway (SeGW) 190, adapted to connect the UE 115 to the packet core network 110. At establishment of a PDN connection, the UE 115 is adapted to select one eNodeB 180 for the connection based on e.g. radio conditions. The eNodeB 180 is then adapted to establish a connection to one SeGW 190.

At the establishment of the PDN connection, the MME 300 is adapted to select one SGW 160 to be connected to the SeGW 190. The MME 300 is further adapted to select one PGW 170 for the connection from the selected SGW 160. The selected PGW 170 is adapted to establish the connection to a PDN on the Internet 130 or supplied by the operator 140. The system 100 optionally comprises an Autonomous System Border Router (ASBR) 200 adapted to route the traffic of the PDN connection in the example wherein the PDN is hosted on the Internet 130.

The system 100 further comprises a Domain Name System (DNS) server 400 and a DNS configuration tool 500. The DNS server 400 is adapted to store information about the user plane nodes 150 of the packet core network 110. The MME 300 is further adapted to use this information during the selection process of the user plane nodes 150. The DNS configuration tool 500 is adapted to store the information about the user plane nodes in the DNS server 400.

Figure 2:
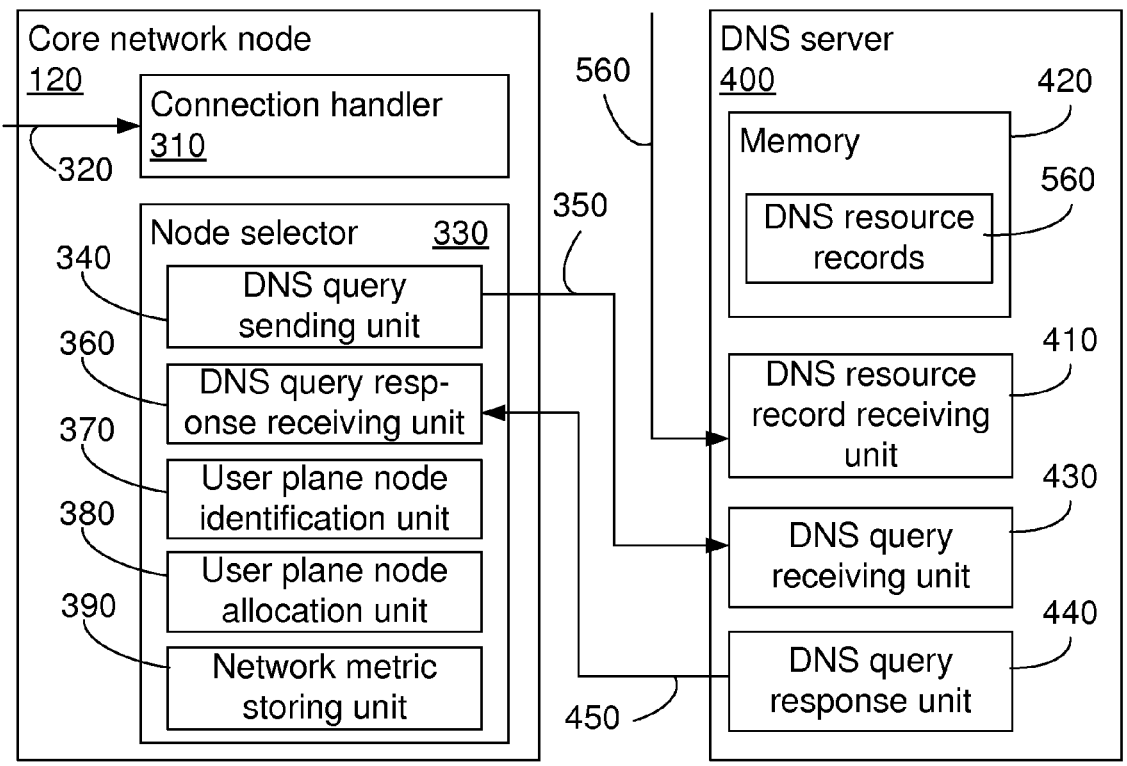
FIG. 2 shows a schematic block diagram of an embodiment of the arrangement in the core network node and the DNS server.

FIG. 2 shows a schematic, exemplifying block diagram of a core network node 120 adapted to allocate one or more user plane nodes 150 to a PDN connection in the packet core network 110, and a DNS server 400 adapted to store and provide information about the user plane nodes 150. The information about the user plane nodes 150 is stored in resource records 560. One example of one resource record 560 is the S-NAPTR Resource Record. The core network node 120 comprises a connection establishment handler 310 adapted to receive a connection establishment request 320. The connection establishment request 320 is triggered by the user equipment (UE) and sent to the core network node 120 when a user plane node 150 is to be allocated to a PDN connection in the packet core network 110. The core network node 120 further comprises a node selector 330 adapted to select user plane nodes 150 for the PDN connection upon reception of the connection establishment request 320.

The node selector 330 comprises a DNS query sending unit 340 adapted to send one or more DNS queries 350 to the DNS server 400, a DNS query response receiving unit 360 adapted to receive the one or more DNS query responses 450 from the DNS server 400. The node selector 330 also comprises a user plane node identification unit 370 adapted to identify a user plane node in the system 100 currently allocated to the PDN connection, and a user plane node allocation unit 380 adapted to allocate user plane nodes 150 to a PDN connection in the packet core network 110. The user plane node allocation unit 380 is further adapted to allocate the user plane node 150 based on the information in the one or more DNS query responses and the node in the system 100 identified by the user plane node identification unit 370. The node selector 330 may also comprise a network metrics storing unit 390 adapted to store network metrics 520 of the packet core network 110.

Figure 3:
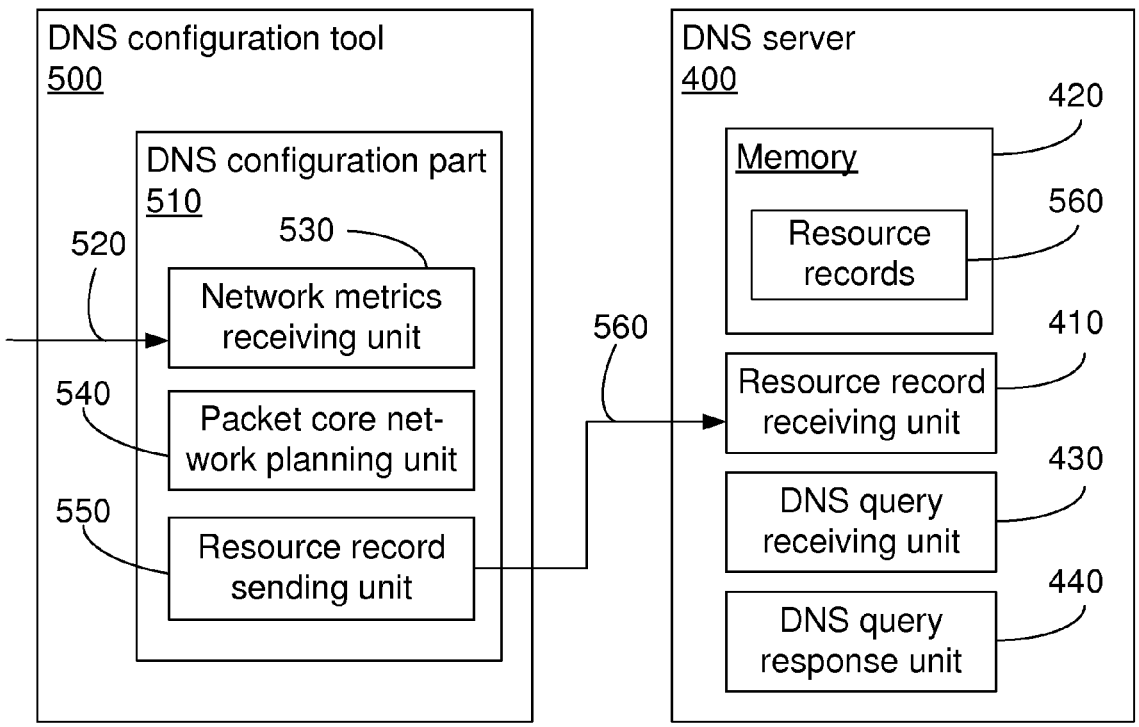
FIG. 3 shows a schematic block diagram of an embodiment of the arrangement in the DNS configuration tool and the DNS server.

The DNS server 400 comprises a DNS resource record receiving unit 410 adapted to receive resource records 560 from the DNS configuration tool 500 (the DNS configuration tool 500 is shown in FIG. 3). The DNS resource record receiving unit 410 is further adapted to store the DNS resource records 560 in a memory 420. The DNS server 400 further comprises a DNS query receiving unit 430 adapted to receive DNS queries 350 from the core network node 120, and a DNS query response unit 440 adapted to, in response to the DNS query 350, send a DNS query response 450 to the core network node 120. The DNS query response unit 440 is further adapted to base the DNS query response 450 on the information stored in the resource records 560 stored in the memory 420.

FIG. 3 shows a schematic, exemplifying block diagram of a DNS configuration tool 500 adapted to configure the DNS server 400. The DNS server 400 has been shown in FIG. 2. The DNS configuration tool 500 comprises a DNS configuration part 510 adapted to receive network metrics 520 and to send resource records 560, based on the network metrics 520, to the DNS server 400. The DNS configuration part 510 comprises a network metrics receiving unit 530 adapted to receive network metrics 520 of the packet core network 110, a packet core network planning unit 540 adapted to plan the domain name structure of the user plane nodes, a resource record sending unit 550 adapted to send resource records 560 representing the planned domain name structure to the DNS server 400.

According to the invention a method is disclosed for enabling the allocation of user plane nodes 150 to a connection being established across a packet core network 110. The method comprising maintaining at a Domain Name System (DNS) server 400 one or more DNS resource records 560 for each available user plane node 150 in the packet core network 110, wherein the one or more DNS resource records 560 comprises a fully qualified domain name (FQDN) for each area identity, each area identity represents a group of user plane nodes, associated with a user plane node 150 in the packet core network 110, processing a connection establishment request originating from a user equipment (UE) 115 to a core network node 120 within the packet core network 110, sending a DNS query 350 to a DNS server 400, the query 350 containing at least one criterion for selecting a user plane node 150, receiving the query 350 at the DNS server 400 and, on the basis of the or each criterion, identifying one or more DNS resource records 560 satisfying the criteria/criterion, and returning the identified DNS resource record(s) 560 to said core network node 120, and receiving the DNS resource record(s) 560 at the core network node 120, and using the fully qualified domain names (FQDNs) representing each area identity associated with a user plane node 150 in the packet core network 110 that are contained in the or each DNS resource record(s) 560 when allocating a user plane node 150 to said connection.

By enabling the allocation of user plane nodes according to the above, each of the DNS resource records 560 stored in the DNS server 400 contains a fully qualified domain name (FQDN) of a user plane node 150. This implies that every user plane node's position in the network topology of the packet core network 110 is defined by the DNS resource records 560 in the DNS server 400. When a connection establishment request is processed and the one or more DNS resource records 560 matching the criterion of the DNS query 350 are received at the core network node 120 the FQDN(s) of the one or more DNS resource records 560 can be compared with the FQDN of another received DNS resource record 560 or with the FQDN of a user plane node 150 currently allocated to said connection. If more than one DNS resource records 560 are received the user plane node allocation is based on the FQDNs of the received DNS resource records 560. Since the FQDNs reflect the associated user plane nodes' position in the packet core network 110 the core network node 120 is then able to more efficiently select and allocate a user plane node 150 to the connection.

In order to illustrate the inventive concept of the method of enabling the allocation of user plane nodes 150 to a connection being established across a packet core network 110, the area structure and FQDN naming structure in relation to the network topology of the packet core network 110 will be explained below with reference to FIGS. 4 (a) and (b).

Figure 4:
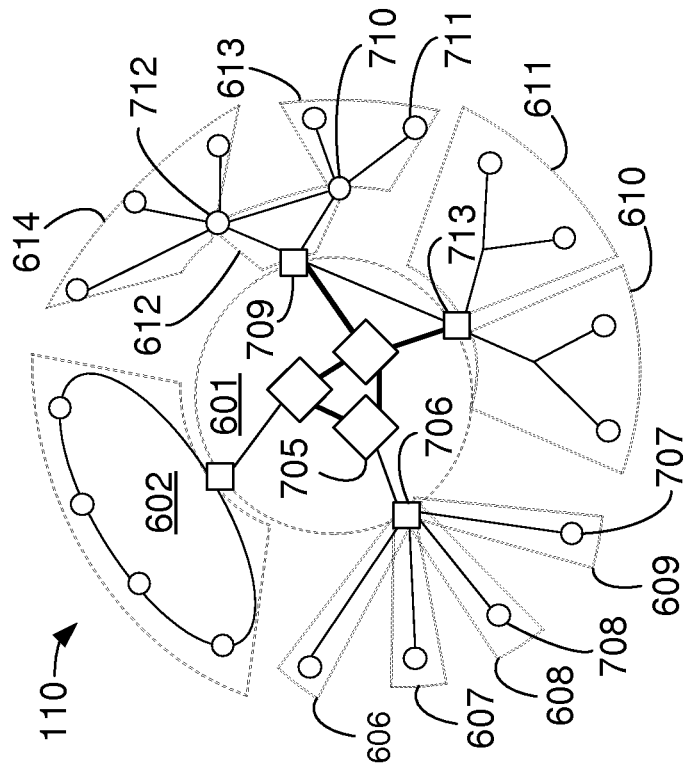
FIG. 4 shows schematic exemplifying illustrations of the network topology of a packet core network
Figure 4:
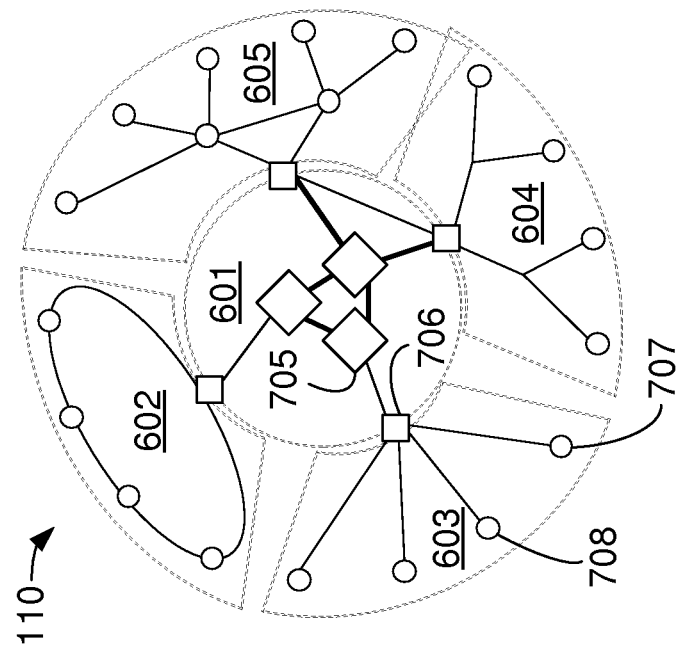

FIGS. 4 (a) and (b) shows schematic exemplifying illustrations of the network topology of a packet core network 110. The packet core network 110 comprises sites, for example 705, 706 and 707, wherein each site comprises one or more user plane nodes 150 (not shown in the illustration). Each site is positioned at a specific hierarchical level in the tree-structured network topology of the packet core network 110. The example in FIG. 4 (a) shows three hierarchical levels in network topology of the packet core network 110. However, any number of hierarchical levels is possible. At the highest hierarchical level of the packet core network 110 a number of interconnected sites comprise top level sites, denoted by diamonds. One top level site is referred to as 705 in the illustration. At the middle hierarchical level of the packet core network 110 a number of sites comprises middle level sites, denoted by squares. Each top level site is connected to at least one middle level site and each middle level site is connected to one top level site. The top level site 705 is connected to the middle level site 706. At the lowest hierarchical level of the network topology in packet core network 110 a number of sites comprises lower level sites, denoted by circles. Each lower level site is connected to either at least one other lower level site and/or one middle level site. The middle level site 706 is connected to the lower level sites 707 and 708.

Each of the sites in the packet core network 110 is associated with at least one area identity 601-614 based on the network topology of the packet core network 110. Each area identity represents an area or a group of sites. The area identities are adapted to facilitate a name structure of the user plane nodes 150 based on the network topology of the packet core network 110. In FIG. 4 (a) the top level sites and the middle level sites are associated with the area identity 601 adapted to represent an area of a first hierarchical level in the network topology of the packet core network 110. One example of the area identity 601 is "Backbone_Area". Further, each middle level site as well as the lower level sites connected to said middle level site are associated with an area identity 602-605, adapted to represent areas of a second hierarchical level in the network topology of the packet core network 110. Examples of the area identities 602 through 605 are "Area602", "Area603", "Area604" and "Area605" respectively. Consequently, each of the middle level sites is associated with two area identities, namely the area identity 601 of the first level area as well as the area identity 602-605 of each of the second level areas. Thus, the areas are overlapping and in FIG. 4 (a) the first level 601 area is overlapping each of the second level areas 602-605. Each middle level site in the example of FIG. 4 (a) comprises a border between areas of a first and a second hierarchical level and is therefore referred to as a border site. Hence the middle level site 706 is a border site placed on the border of the areas identified as "Backbone_Area" and "Area603".

As previously mentioned the sites in FIGS. 4 (*a*) and (*b*) comprises user plane nodes 150. Each of these user plane nodes 150 is also associated with one of the area identities 601-614 based on which site said user plane node 150 is located at. For example, a user plane node 150 located at the site 706 is associated with the area identities 601 and 603.

When the DNS configuration tool 500 is configuring the DNS server 400 the areas are defined by the packet core network planning unit 540 based on network metrics 520 received by the network metrics receiving unit 530. The packet core network planning unit 540 is defining the areas by associating each of the user plane nodes 150 with one or more areas identities 601-614.

Then, each of the user plane nodes 150 is associated with one or more fully qualified domain names (FQDNs) by the packet core network planning unit 540. In the case where the user plane node 150 is located in a site where two areas overlap, one FQDN is created for each overlapping area. Each FQDN comprises at least from left to right:

a name of a user plane node 150;

the area identity associated with said user plane node 150; and for each of the higher level areas reached by traversing the hierarchical tree structure of the packet core network 110 through the border nodes, the area identity associated with said higher level area.

For example, by referring to the area structure of FIG. 4 (*a*), a user plane node 150, denoted "NodeX", located in site 707 is associated with the FQDN "NodeX.Area603.Backbone_Area", since "Area603" is the area identity associated with said node, and "Backbone_Area" is associated with the higher level area reached by traversing the tree structure of the packet core network 150 though the border site 706. In this example the "Backbone_Area" area is the top level area. Accordingly, another user plane node 150, denoted "NodeY", located in site 708 would be associated with the FQDN "NodeY.Area603.Backbone_Area". Continuing the example with reference to FIG. 4 (*a*), yet another user plane node 150, denoted "NodeZ", located in the site 706 would be associated with two FQDNs since the site 706 is associated with the two area identities 601 and 603. Accordingly, the user plane node "NodeZ" is associated with the FQDNs of "NodeZ.Area603.Backbone_Area" and "NodeZ.Backbone_Area".

When the user plane node allocation unit 380 of the core network node 120 is performing a longest suffix match on the FQDNs of the two user plane nodes located in site 707 and 708 it is determined that said two user plane nodes belongs to the same area since the FQDNs of "NodeX.Area603.Backbone_Area" and "NodeY.Area603.Backbone_Area" both have the same suffix, i.e. ends with "Area603.Backbone_Area". By performing a longest suffix match on the FQDNs of the two user plane nodes located in site 707 and 706, two different results will be acquired depending on which one of the two FQDNs associated with the user plane node "NodeZ" is used. If the FQDN of "NodeZ.Area603.Backbone_Area" is used the longest suffix match would result in a match of the area of the user plane nodes since the FQDNs of "NodeX.Area603.Backbone_Area" and "NodeZ.Area603.Backbone_Area" both have the same suffix, i.e. ends with "Area603.Backbone_Area". If, on the other hand, the FQDN of "NodeZ.Backbone_Area" would be used, the comparison would result in that the two user plane nodes located in site 707 and 706 belongs to the same first level area since the FQDNs of "NodeX.Area603.Backbone_Area" and "NodeZ.Backbone_Area" matches on "Backbone_Area" only.

In FIG. 4 (*b*) the network topology of the packet core network 110 is the same as in FIG. 4 (*a*) but the areas are defined differently. The four lower level sites connected to the middle level site 706, are all associated with area identity 603 in FIG. 4 (*a*), but are associated with the area identities 606, 607, 608 and 609 in FIG. 4 (*b*). Continuing the example above the user plane node "NodeZ" located in site 706 would be associated with five different FQDNs, "NodeZ.Backbone_Area", "NodeZ.Area606", "NodeZ.Area607", "NodeZ.Area608" and "NodeZ.Area609". Thus, a longest suffix match of a user plane node located in site 707 and 708 according to the area structure of FIG. 4 (*b*) would not match on the second level area since the FQDNs of "NodeX.Area609.Backbone_Area" and "Nodey.Area608.Backbone_Area" only matches on the first level area, i.e. "Backbone_Area".

The area structure of FIG. 4 (*b*) is further changed in that the area identity 605 of FIG. 4. (*a*) is divided in three subareas 612, 613 and 614. The lower level sites associated with the second level area identity 605 in FIG. 4 (*a*) comprise a hierarchical tree structure. To reflect this network topology the area identities 612, 613 and 614 comprises a two level structure. The area identity 612, for example "area612", is associated with the middle level site 709 and the lower level sites 710 and 712 directly connected to it. This area identity constitutes a second level area identity. The area identity 613, for example "area613", is associated with the lower level site 710, which in FIG. 4 (*b*) constitutes a border site, and the lower level sites connected to it. This area identity constitutes a third area identity. I the same way the third level area identity 614 is associated with the border site 712 and the lower level sites connected to it. This area structure would be reflected in the FQDN of the user plane nodes 150 according to the following example. A user plane node 150, denoted "NodeX", located at the site 711 would be associated with the FQDN of "NodeX.area613.area612.Backbone_Area". A user plane node 150, denoted "NodeY", located at the site 710 would be associated with the FQDNs of "NodeY.area613.area612.Backbone_Area" and "NodeY.area612.Backbone_Area" since the node constitutes a border node and belongs to the two areas "area612" and "area613".

Another difference between the area structures of FIGS. 4 (*a*) and (*b*) is that the area identity 604 in FIG. 4 (*a*) is vertically divided into the area identities of 610 and 611 in FIG. 4 (*b*). User plane nodes 150 located at the border site 713 will be associated with the three area identities of 601, 610 and 611, and thus be associated with three different FQDNs accordingly.

The area structures of FIGS. 4 (*a*) and (*b*) serves as illustrative examples of how the area structure could be adapted according to the network topology of the packet core network 110 and according to different criteria related to the transmission of data between the user plane nodes 150. Other examples of area structures are possible.

The at least one user plane node 150 in the packet core network is associated with at least two area identities. This advantageously allows the areas, or group of nodes, to overlap each other. The overlapping facilitates associating a given user plane node 150 with different network topology relations. The user plane node 150 to be allocated to the connection should be selected on the basis of its location in the network topology in relation to the location in the network topology of either another user plane node 150 to be allocated to the connection or a user plane node 150 currently allocated to the connection. A first user plane node 150 may have a close relation to a second user plane node 150. However, the second user plane node 150 may be positioned in an area different from the area the first user plane node 150 belongs to. If the second user plane node 150 is associated with both areas the close relation between the two user plane nodes will be reflected in the FQDN structure. Therefore, associating one user plane node with at least two FQDN is useful to further facilitate the operation of efficiently selecting and allocating a user plane node to a connection in the packet core network.

Further, each area identity represents an area or group of user plane nodes 150 defined based on at least one criterion related to the transmission of data between the user plane nodes 150 and associated hierarchical levels of the user plane nodes 150 in the packet core network 110. This advantageously allows the areas, or groups of nodes, to be structured according to specific properties of the packet core network 110. If the data transfer cost between two specific user plane nodes 150 are high, even though that they are positioned geographically close, they may be associated with different areas to prevent or decrease the probability of establishing a connection between them. Other examples of criteria related to the transmission of data is a metric used by the routing protocol in the packet core network, a metric derived from traffic engineering requirements, a bandwidth related metric, a delay related metric, a packet loss probability metric, and a transmission cost related metric. Also, if the areas correlate with the hierarchical levels of the packet core network 110 the connections can be directed to user plane nodes 150 on the basis of the hierarchical levels of the packet core network 110. Hence, areas based on the different criteria as described above further facilitates the operation of efficiently selecting and allocating a user plane node to a connection in the packet core network.

Figure 5:
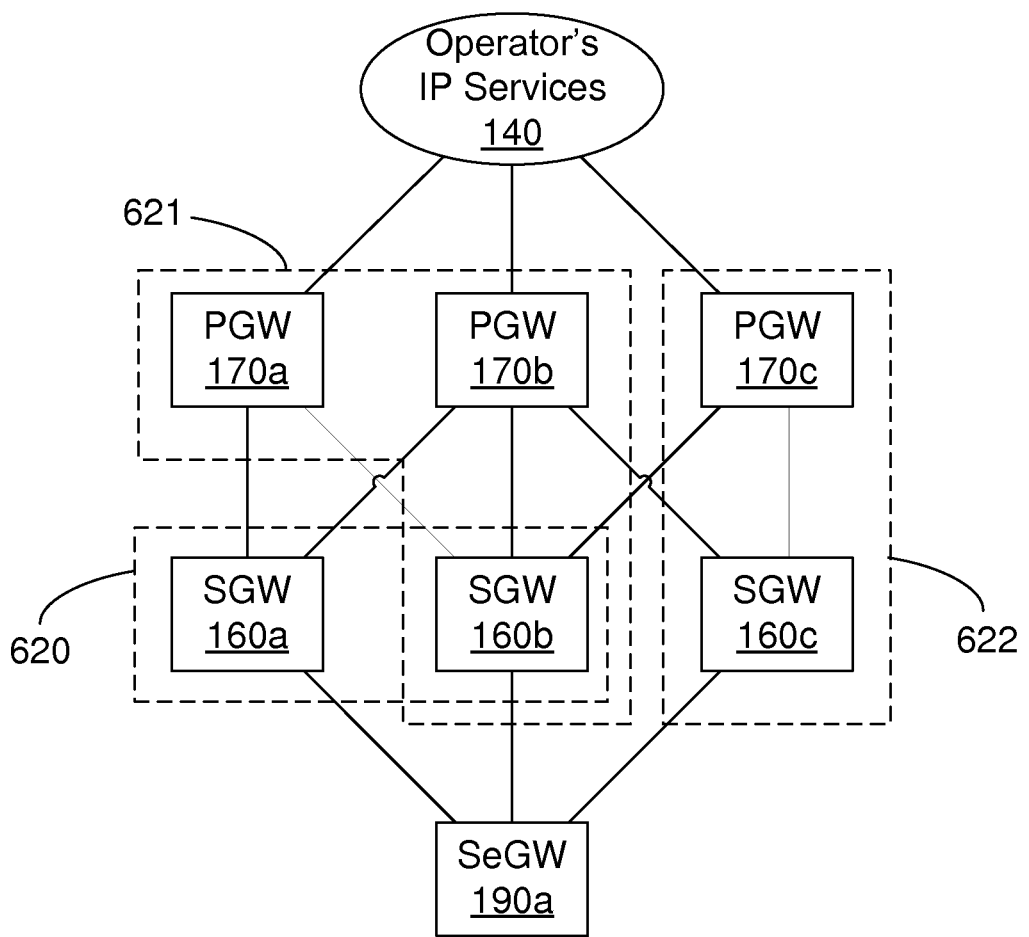
FIG. 5 shows another schematic exemplifying illustration the allocation of user plane nodes to a connection being established in a packet core network.

FIG. 5 shows another schematic exemplifying illustration of the allocation of user plane nodes 150 to a connection being established in a packet core network 110. The figure shows alternative connections between a number of user plane nodes 150 from the SeGW 190a to an operator's IP services 140. The core network node 120 and DNS server 400 are left out from the illustration. A connection establishment request 320 is received by the connection handler 310 of a core network node 120. The connection establishment request 320 is originating from a user equipment (UE) 115. In the case of an initial attach both an SGW 160 and a PGW 170 should be allocated to the connection. From the connection establishment request 320 the core network node 120 identifies that both a Serving Gateway (SGW) 160 and a PDN Gateway (PGW) 170 is to be allocated to the connection being established. The core network node 120 sends, via the DNS query sending unit 340, a DNS query 350 including at least one criterion for selecting SGW(s) and PGW(s).

The DNS server 400 (not shown) identifies the DNS resource records 560 matching the included criterion/criteria for the allocation of a SGW 160 to the connection, for example 160a and 160b of FIG. 5. The DNS server 400 further identifies the DNS resource records 560 matching the included criterion/criteria for the allocation of a PGW 170 to the connection, for example 170b and 170c of FIG. 5. The DNS query response 450 received by the DNS query response receiving unit 360 comprise the FQDN of the identified DNS resource records 560. In the example the FQDNs of the received DNS resource records 560 are "SGWa.Area620.Backbone", "SGWb.Area620.Backbone" and "SGWb.Area621.Backbone" associated with the user plane nodes 160a, 160b and 160b respectively as well as "PGWb.Area621.Backbone" and "PGWc.Area622.Backbone" associated tithe user plane nodes 170b and 170c respectively. The user plane allocation unit 380 of the core network node 120 is then able to select one SGW 160 as well as one PGW 170 to be allocated to the connection based on FQDNs of these user plane nodes 150. Based on a longest suffix match the core network node 120 is able to determine that the FQDN of "SGWb.Area621.Backbone" and "PGWb.Area621.Backbone" are associated with user plane nodes 150 that belongs to the same area, that is the area identified by the identity of "Area621". Then the user plane allocation unit 380 is able to allocate the user plane nodes 160b and 170b to the connection being established.

In another case where either an SGW 160 or a PGW 170 is to be allocated to the connection, the FQDN of the user plane node 150 to be allocated to the connection should be matched against the FQDN of the user plane node 150 currently allocated to the connection. If a PGW 170 is to be allocated to a connection where a SGW 160 is currently allocated, the allocation of the PGW 170 should be performed on the basis of its topological relation to the currently allocated SGW 160. Referring again to FIG. 5 a PDN Gateway (PGW) 170 needs to be allocated to the connection being established in the packet core network 110. SGWb 160b is currently allocated to the connection. The DNS query response 450 reveals three candidate FQDNs based on the selection criterion, namely "PGWa.Area621.Backbone", "PGWb.Area621.Backbone" and "PGWc.Area622.Backbone" associated with the user plane nodes 170a, 170b and 170c respectively. After matching the FQDNs of the user plane node 150 currently allocated to the connection, that is 160b, of "SGWb.Area620.Backbone" and "SGWb.Area621.Backbone" against the FQDN of the candidate FQDNs both FQDNs of "PGWa.Area621.Backbone" and "PGWb.Area621.Backbone" are determined to belong to the same area by the core network node 120, that is "Area621.Backbone". In this example the core network node 120 is adapted to make the selection of the two candidate user plane nodes 150 based on at least one criterion related to the transmission of data between the user plane nodes 150. Since the cost for transmission of data between the user plane nodes 160b and 170a is lower than the corresponding cost between the user plane nodes 160a and 170b the user plane node 170a is selected for the allocation. Finally the user plane node allocation unit 380 allocated user plane node 170b to the connection being established in the packet core network 110.

Figure 6:
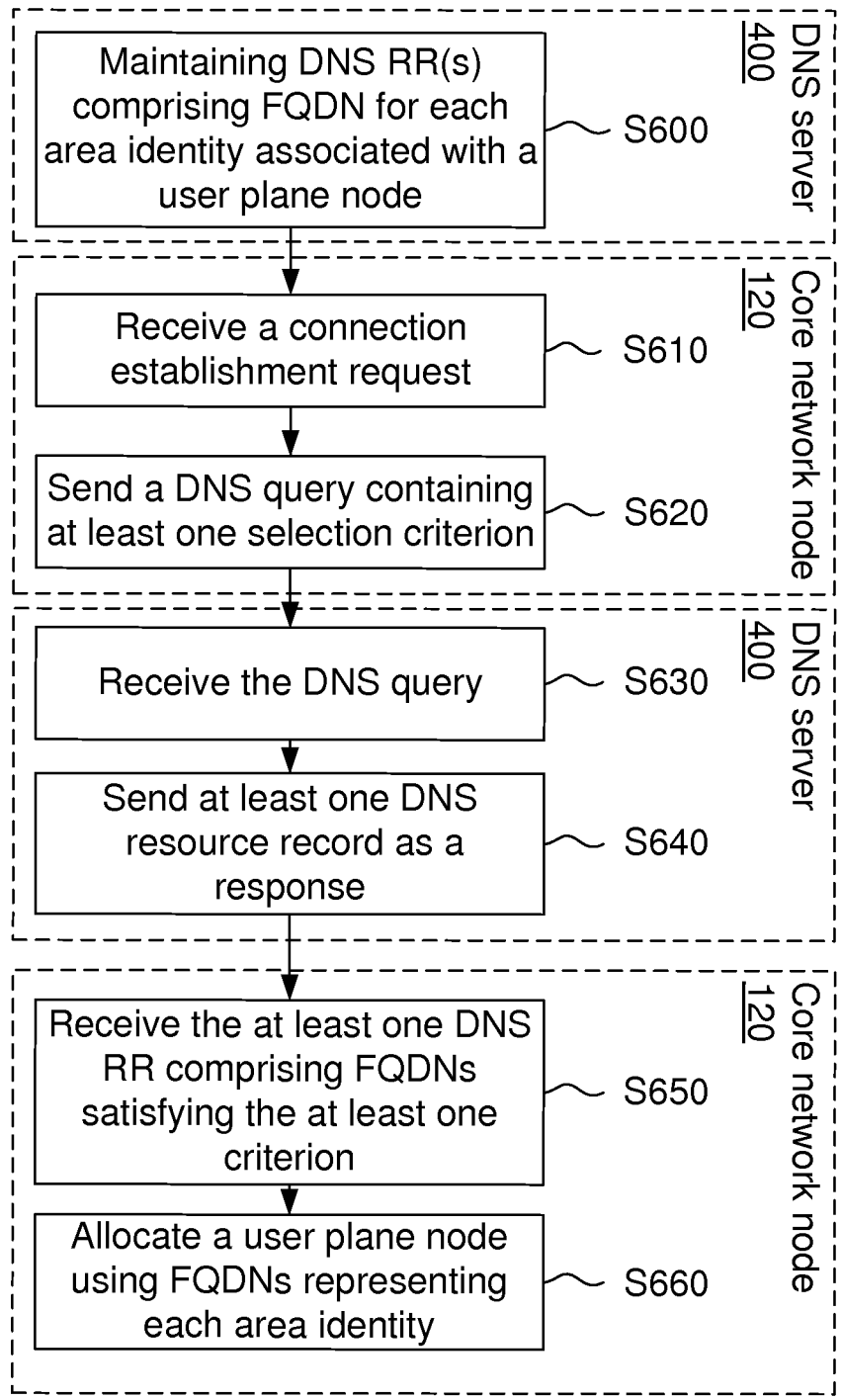
FIG. 6 shows an exemplifying flowchart describing the method for allocating user plane nodes to a connection being established across a packet core network

FIG. 6 shows an exemplifying flowchart describing the method for allocating user plane nodes to a connection being established across a packet core network. The method steps 600, S630 and S640 are performed in the DNS server 400. The method steps S610, S620, S650 and S660 are performed in the core network node 120.

In S600 the DNS server 400 is maintaining one or more DNS resource records (RR) for each available user plane node 150 in the packet core network 110, wherein the one or more DNS resource records 560 comprises a fully qualified domain name (FQDN) for each area identity associated with a user plane node 150 in the packet core network 110.

In S610 the core network node 120 receives a connection establishment request 320 originating from a user equipment (UE). The core network node 120 is able to identify the user plane currently connected to the connection, if any, based on the connection establishment request 320.

In S620, in response to the receipt of the connection establishment request 320, the core network node 120 sends a DNS query 350 to a DNS server 400, the query 350 containing at least one criterion for selecting a user plane node 150. Based on the content of the connection establishment request 320 the core network node 120 determines the at least criterion for selecting a user plane node 150. One example of such a criterion is Serving Gateways (SGWs) 160 serving the Tracking Area Identity (TAI) of "0x2234". Another example of the criterion is PDN Gateways (PGWs) 170 supporting the Access Point Name (APN) of "Internet".

In S630 the DNS server 400 receives the DNS query 350 sent by the core network node 120. Based on the at least one criterion included in the DNS query 350 the DNS server 400 identifies one or more DNS resource records 560 stored in the memory 420. All DNS resource records 560 that match the at least one criterion are identified. Each DNS resource record 560 stores a fully qualified domain name (FQDN) associated with a specific user plane node 150.

In S640 the DNS server 400 sends the one or more DNS resource records 560 identified in S630 as a response to the DNS query sent in S620.

In S650 the core network node 120 receives the response from the DNS server 400 sent in S640 comprising at least one DNS resource record satisfying the at least one criterion for selecting a user plane node 150.

In S660 the core network node allocates the user plane node 150 to the connection being established by using fully qualified domain names (FQDNs) representing each area identity associated with a user plane node 150 in the packet core network 110 that are contained in the or each at least one DNS resource record(s) 560. When performing the selection the FQDN(s) of the one or more DNS resource records 560 can be compared with the FQDN of another received DNS resource record or with the FQDN of a user plane node currently allocated to said connection. If more than one DNS resource records 560 are received the user plane node allocation is based on the FQDNs of the received DNS resource records 560. Since the FQDNs reflect the associated user plane nodes' 150 position in the packet core network 110 the core network node 120 is then able to more efficiently select and allocate a user plane node 150 to the connection.

The step S660 may further comprise matching each of the fully qualified domain names (FQDN) of each of the received DNS resource records 560 with the FQDN of another received DNS resource record 560 or with the FQDN of a user plane node 150 currently allocated to said connection, selecting the user plane node 150 of which the FQDN of the received DNS resource record 560 matches the most number of area identities, from right to left, with the FQDN of another received DNS resource record 560 or with the FQDN of a user plane node 150 currently allocated to said connection, and if more than one user plane node 150 matches the most number of area identities, selecting the user plane node 150 of which the FQDN has the least number of area identities. This advantageously allows proper selection of a user plane node 150 based on the topology position in the packet core network 110. By using the user plane node 150 with the longest suffix match the closest, from a network topology perspective, user plane node 150 is allocated to the connection. However, when none of the candidate user plane nodes 150 belong to the same area as another user plane node 150 being allocated to the connection or a user plane node 150 currently allocated to said connection several of the candidate user plane nodes 150 may have the same suffix. Then the user plane node 150 with the least number of area identities will be the one with the most preferable position in the network topology. This is because since none of the user plane nodes 150 belong to the same area as another user plane node 150 being allocated to the connection or a user plane node 150 currently allocated to said connection the user plane node 150 to select will be found, in the best case, on the higher neighboring level of the hierarchical tree structure of the packet core network 110. Then, due to the hierarchical tree structure of the packet core network 110 a match with more area identities will always be more distant than a match with lesser matching area identities since the hierarchy would have to be traversed first to a higher level and then down to a lower level. Hence, the selection rule above further facilitates the operation of efficiently selecting and allocating a user plane node to the connection in the packet core network 110.

The step S660 may further comprise if more than one user plane nodes 150 matches the most number of area identities, and the same user plane nodes 150 has an equal number of area identities, selecting the user plane node 150 based on at least one criterion related to the transmission of data to and from the same user plane nodes 150. This advantageously allows the selection of a user plane node 150 even if more than one FQDN of the received DNS resource records 560 matches the most number of area identities and has an equal number of area identities. In this case a criterion related to the transmission of data between the user plane nodes 150 is used to select the user plane node 150 to allocate to the connection. Hence, the selection rule above further facilitates the operation of efficiently selecting and allocating a user plane node 150 to the connection in the packet core network 110.

The step S660 may further comprise that the criterion related to the transmission of data to and from the same the user plane nodes 150 relates to one or more of the following items, a metric used by the routing protocol in the network, a metric derived from traffic engineering requirements, a bandwidth related metric, a delay related metric, a packet loss probability metric, and a transmission cost related metric. The network metric may be stored in the network metrics storing unit 390 in the core network node 120. This advantageously allows the selection of a user plane node 150 based on metrics of the packet core network 110 in cases when the FQDN structure does not provide enough information for the selection. Hence, the selection rule above further facilitates the operation of efficiently selecting and allocating a user plane node 150 to the connection in the packet core network 110.

The step S660 may further comprise selecting the user plane node 150 of which a site identity of the FQDN of the received DNS resource record matches a site identity of the FQDN of another received DNS resource record 560 or with the FQDN of a user plane node 150 currently allocated to said connection. This advantageously allows the prioritizing selecting a user plane node 150 located at the same site as another user plane node 150 being allocated to the connection or a user plane node 150 currently allocated to the connection. User plane nodes 150 located at the same site usually are located close to each other. Further e.g. data transmission costs are usually low within the same site. Therefore, including the user plane node's site in the FQDN further facilitates the operation of efficiently selecting and allocating a user plane node 150 to a connection in the packet core network 110.

Even though the invention has been described with reference to specific exemplifying embodiments thereof, many different alterations, modifications and the like will become apparent for those skilled in the art. The described embodiments are therefore not intended to limit the scope of the invention, which is defined by the appended claims.

The invention claimed is:

1. A method of allocating user plane nodes to a connection being established across a packet core network, comprising:
maintaining at a Domain Name System (DNS) server one or more DNS resource records for each available user plane node in the packet core network, wherein the one or more DNS resource records comprises a fully qualified domain name (FQDN) for each area identity, each area identity represents a group of user plane nodes, associated with a user plane node in the packet core network;
processing a connection establishment request originating from a user equipment (UE) to a core network node within the packet core network;
sending a DNS query to a DNS server, the query containing at least one criterion for selecting a user plane node;
receiving the query at the DNS server and, on the basis of the at least one criterion, identifying one or more DNS resource records satisfying the criterion, and returning the identified one or more DNS resource records to said core network node; and
receiving the one or more DNS resource records at the core network node, and using the FQDNs representing each area identity associated with a user plane node in the packet core network that are contained in the one or more DNS resource records when allocating a user plane node to said connection, wherein using the FQDNs representing each area identity associated with a user plane node in the packet core network when allocating a user plane node to said connection comprises
matching each of the FQDNs of each of the received DNS resource records with the FQDN of another received DNS resource record or with the FQDN of a user plane node currently allocated to said connection;
selecting the user plane node of which the FQDN of the received DNS resource record matches the most number of area identities, from right to left, with the FQDN of another received DNS resource record or with the FQDN of a user plane node currently allocated to said connection; and
if more than one user plane nodes matches the most number of area identities, selecting the user plane node of which the FQDN has the least number of area identities.

2. The method according to claim 1, wherein at least one user plane node in the packet core network is associated with at least two area identities.

3. The method according to claim 1, wherein each area identity is defined based on at least one criterion related to the transmission of data between the user plane nodes and associated hierarchical levels of the user plane nodes in the packet core network.

4. The method according to claim 1, wherein the FQDN for each user plane node and each area identity associated with that user plane node comprises from left to right: the name of the user plane node; the area identity associated with the user plane node; and, for each of a higher hierarchical level, the area identity of a neighboring area on that higher hierarchical level.

5. The method according to claim 1, wherein the method is used to allocate at least one of the following user plane nodes to the connection:
a Serving Gateway; and
a Packet Data Network Gateway.

6. The method according to claim 1, wherein the packet core network is a 3GPP Evolved Packet Core Network or 3GPP UMTS Packet Core Network.

7. A method for allocating user plane nodes to a connection being established across a packet core network, the method comprising:
receiving a connection establishment request originating from a user equipment (UE);
in response to the receipt of the connection establishment request, sending a Domain Name System (DNS) query to a DNS server, the DNS query containing at least one criterion for selecting a user plane node;
receiving a response from the DNS server comprising at least one DNS resource record satisfying the at least one criterion for selecting a user plane node; and
allocating a user plane node to the connection being established by using fully qualified domain names (FQDNs) representing each area identity associated with a user plane node in the packet core network that are contained in the at least one DNS resource records, wherein allocating the user plane node to the connection being established further comprises:
matching each of the FQDNs of each of the received DNS resource records with the FQDN of another received DNS resource record or with the FQDN of a user plane node currently allocated to said connection;
selecting the user plane node of which the FQDN of the received DNS resource record matches the most number of area identities, from right to left, with the FQDN of another received DNS resource record or with the FQDN of a user plane node currently allocated to said connection; and
if more than one user plane nodes matches the most number of area identities, selecting the user plane node of which the FQDN has the least number of area identities.

8. The method according to claim 7, wherein allocating the user plane node to the connection being established, further comprises:
if more than one user plane nodes matches the most number of area identities, and the same user plane nodes has an equal number of area identities, selecting the user plane node based on at least one criterion related to the transmission of data to and from the same user plane nodes.

9. The method according to claim 8, wherein the criterion related to the transmission of data to and from the same user plane nodes relates to one or more of the following items:
a metric used by the routing protocol in the network;
a metric derived from traffic engineering requirements;
a bandwidth related metric;
a delay related metric;
a packet loss probability metric; and
a transmission cost related metric.

10. The method according to claim 7, wherein allocating the user plane node to the connection being established further comprises selecting the user plane node of which a site identity of the FQDN of the received DNS resource record matches a site identity of the FQDN of another received DNS resource record or with the FQDN of a user plane node currently allocated to said connection.

11. The method according to claim 7, wherein the method is carried out at one of a Mobility Management Entity (MME) of a 3GPP Evolved Packet Core network, and a 3GPP UMTS Serving GPRS Support Node (SGSN).

12. A core network node configured to allocate user plane nodes to a connection being established across a packet core network, comprising a processor and a memory, said memory containing instructions executable by said processor, wherein the core network node is configured to:

process a connection establishment request;
in response to receipt of a connection establishment request, send a Domain Name System (DNS) query to a DNS server, the DNS query containing at least one criterion for selecting a user plane node,
receive a response from the DNS server, the response containing at least one DNS resource record satisfying the criterion for selecting a user plane node, and
using fully qualified domain names (FQDNs) representing each area identity associated with a user plane node in the packet core network that are contained in the at least one DNS resource record when allocating a user plane node or nodes to said connection,
match each of the FQDNs of each of the received DNS resource records with the FQDN of another received DNS resource record or with the FQDN of a user plane node currently allocated to said connection,
select the user plane node of which the FQDN of the received DNS resource record matches the most number of area identities, from right to left, with the FQDN of another received DNS resource record or with the FQDN of a user plane node currently allocated to said connection, and
if more than one user plane nodes match the most number of area identities, select the user plane node of which the FQDN has the least number of area identities.

13. The core network node according to claim 12, wherein the core network node is further configured to, if more than one user plane nodes matches the most number of area identities, and the same user plane nodes has an equal number of area identities, select the user plane node based on at least one criterion related to the transmission of data to and from the same user plane nodes.

14. The core network node according to claim 12, wherein the core network node is further configured to select the user plane node of which a site identity of the FQDN of the received DNS resource record matches a site identity of the FQDN of another received DNS resource record or with the FQDN of a user plane node currently allocated to said connection.

15. The core network node according to claim 12, wherein the core network node is a Mobility Management Entity (MME) in a 3GPP Evolved Packet Core network, or a 3GPP UMTS Serving GPRS Support Node (SGSN).

16. An apparatus configured to operate as a Domain Name System (DNS) server within a packet core network comprising a plurality of user plane nodes, the apparatus comprising a processor and a memory, said memory containing instructions executable by said processor wherein said apparatus is configured to:
store one or more DNS resource records for each available user plane node, wherein the one or more DNS resource records comprises a fully qualified domain name (FQDN) for each area identity associated with a user plane node in the packet core network;
receive from a core network node a DNS query,
wherein the DNS query contains one or more criterion for selecting a user plane node, and
wherein the core network node is configured to:
select the user plane node of which the FQDN of the received DNS resource record matches the most number of area identities, from right to left, with the FQDN of another received DNS resource record or with the FQDN of a user plane node currently allocated to said connection;
and if more than one user plane nodes match the most number of area identities, select the user plane node of which the FQDN has the least number of area identities;
identify one or more DNS resource records satisfying the criterion; and
return the one or more identified DNS resource records to said core network node.

17. The method according to claim 16, wherein at least one user plane node in the packet core network is associated with at least two area identities.

* * * * *